C. BEACH.
DETACHABLE HANDLE FOR RECEPTACLES.
APPLICATION FILED FEB. 27, 1914. RENEWED JAN. 12, 1915.

1,143,484.                             Patented June 15, 1915.

Witnesses

Inventor
Charles Beach,
By Victor J. Evans
Attorney

UNITED STATES PATENT OFFICE.

CHARLES BEACH, OF MUSCATINE, IOWA.

DETACHABLE HANDLE FOR RECEPTACLES.

1,143,484.  Specification of Letters Patent.  Patented June 15, 1915.

Application filed February 27, 1914, Serial No. 821,522. Renewed January 12, 1915. Serial No. 1,883.

*To all whom it may concern:*

Be it known that I, CHARLES BEACH, a citizen of the United States, residing at Muscatine, in the county of Muscatine and State of Iowa, have invented new and useful Improvements in Detachable Handles for Receptacles, of which the following is a specification.

An object of the invention is to provide a handle attachment for receptacles, and which is particularly adaptable for use in connection with cooking receptacles such as coffee pots and the like, whereby the handle can be removed when the receptacle is on the stove to heat its contents and applied to the receptacle when it is desired to remove and use the same so that the handle will at all times be cool and permit of conveniently carrying the heated receptacle.

Figure 1:
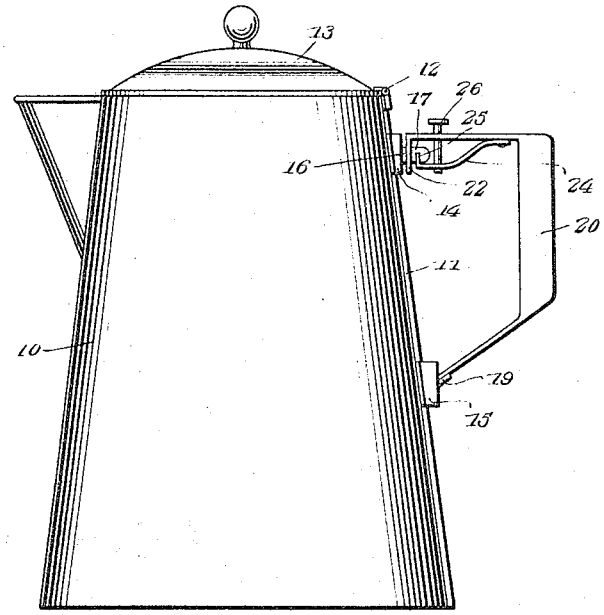
Figure 3:
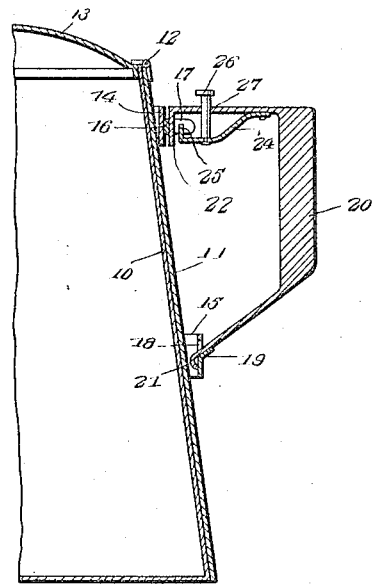
Figure 2:
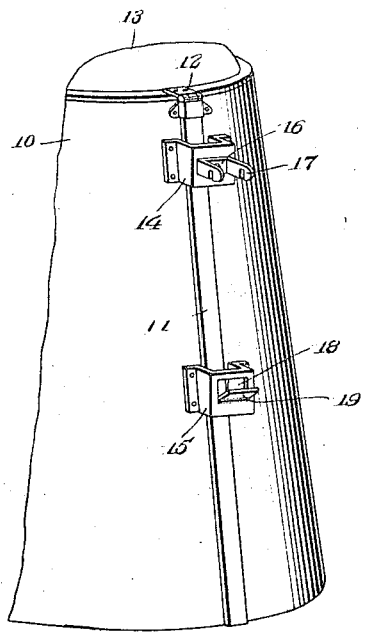
Figure 4:
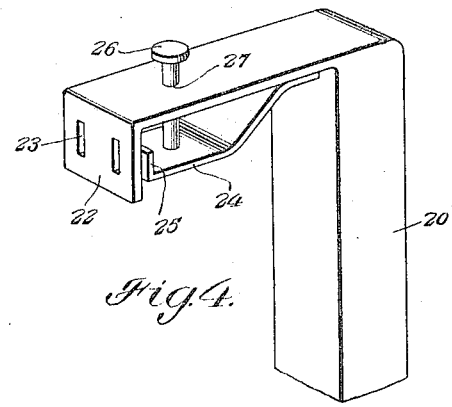

In the further disclosure of the invention reference is to be had to the accompanying drawings, constituting a part of this specification, in which similar characters of reference denote corresponding parts in all the views, and in which:

Figure 1 is a side elevation of the handle applied to a coffee pot; Fig. 2 is a fragmentary perspective view of the coffee pot showing the handle removed; Fig. 3 is a vertical longitudinal sectional view showing the handle applied; and Fig. 4 is a fragmentary perspective view looking at the upper portion of the handle.

Referring more particularly to the views, I disclose a receptacle 10 which, in this instance, is in the form of a coffee pot, the said receptacle being provided with a vertical rib 11, in the upper end of which is carried a suitable hinge 12 of a cover 13 which normally closes the receptacle 10. An upper bracket 14 and a lower bracket 15 are both arranged to extend transversely to the rib and are each preferably of a U-shape, with the said brackets being conveniently secured to the receptacle 10 and adapted to be relatively spaced apart as shown.

The upper bracket 14 carries a transverse plate 16, from which project laterally a plurality of slotted hooks 17 formed by bending the ends of the transverse plate 16 outwardly from the upper bracket 14. The lower bracket 15 is provided with a horizontal slot 18 formed by striking out a flange 19.

A handle body 20 has its lower end bent to form a curved lip 21 adapted to extend through the slot 18, with the lower portion of the handle adapted to lie against the face of the upwardly projecting flange 19.

The upper end of the handle body 20 terminates in a depending plate 22 provided with a plurality of openings 23, through which the hooks 17 are adapted to extend when the plate 22 abuts against the transverse plate 16, and a spring-like locking member 24 has one end rigidly secured to the upper portion of the handle body on its under face and its other free end terminating in an upturned portion 25 which is adapted to extend into the slots of the hooks 17 when the same has been passed through the openings 23 of the plate 22, thus locking the upper end of the handle body to the receptacle 10.

A releasing member 26 in the nature of a headed pin is secured to the locking member 24 and extends loosely through an opening 27 in the upper end of the handle body.

Now when the handle is attached to the receptacle as mentioned and it is desired to remove the same therefrom, it is only necessary to press down on the releasing member 26, thus moving the spring-like locking member 24 out of engagement with the hooks 17 and out of the slots thereof so that the upper end of the handle body can be swung away from the receptacle to permit of removing the lip 21 from the slot 18.

As mentioned heretofore, the device is adapted to be used in connection with vessels or receptacles that are to be heated, and the handle is removed at the time of placing the vessel on the stove and reapplied when it is desired to remove the vessel therefrom so that the handle at all times will be kept cool and the servant or party desiring to use the receptacle or vessel will not expose her hands to the danger of being burned and blistered.

From the foregoing description it will be seen that the device is of a simple construction, can be attached as readily as it can be applied and consists of few and simple parts.

Having thus described my invention, I claim:

1. In combination with a receptacle, upper and lower brackets secured to the receptacle, a plurality of slotted hooks projecting from the upper bracket, a flange projecting from the lower bracket to provide a slot therein, a handle body, a lip formed on the lower end of the handle body to extend into the slot of the lower bracket, an apertured plate formed on the upper end of the handle body and adapted to have the said hooks extend through the apertures thereof, and a spring-like locking member carried by the handle body and adapted to normally extend into the slots of the said hooks to hold the handle body in engagement with the said brackets.

2. In combination with a receptacle, upper and lower brackets secured to the receptacle, a plurality of slotted hooks projecting from the upper bracket, a flange projecting from the lower bracket to provide a slot therein, a handle body, a lip formed on the lower end of the handle body to extend into the slot of the lower bracket, an apertured plate formed on the upper end of the handle body and adapted to have the said hooks extend through the apertures thereof, a spring-like locking member carried by the handle body and adapted to normally extend into the slots of the said hooks to hold the handle body in engagement with the said brackets, and a releasing member having sliding engagement with the handle body and coöperating with the said locking member for moving the same out of locking engagement with the said hooks.

3. In combination with a receptacle, upper and lower brackets on the receptacle, a handle body having its lower end for connection with the lower bracket, slotted members projecting from the upper bracket to engage the upper end of the handle body, a spring-like locking member carried by the handle body to extend into the slots of the said members and lock the handle body thereto, and means for moving the locking member out of locked position relatively to the said slotted members.

In testimony whereof I affix my signature in presence of two witnesses.

CHARLES BEACH.

Witnesses:
Ed. P. Ingham,
Ethel Turner.